July 25, 1967  D. W. VAN NESS  3,332,822
APPARATUS FOR MAKING STRAND REINFORCED WEBS
Filed June 16, 1964
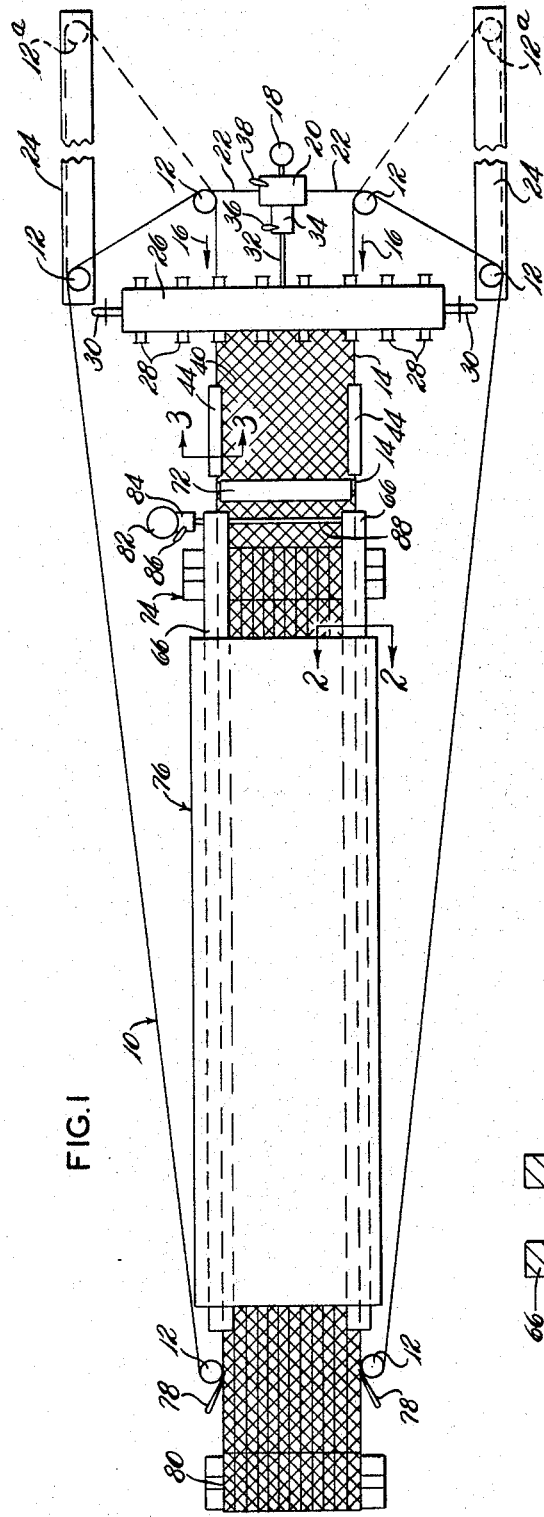
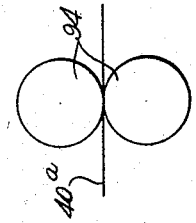
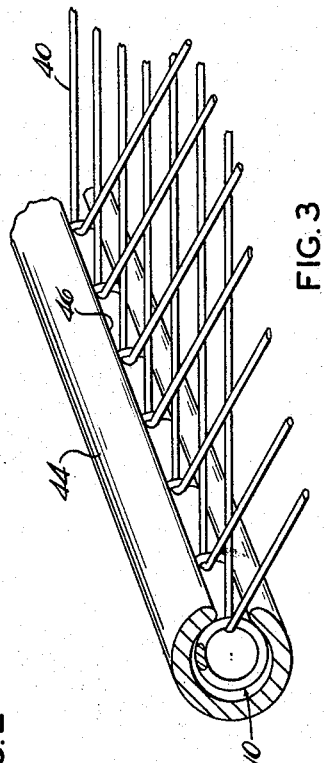
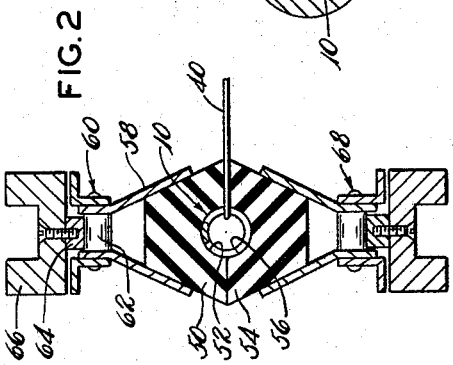
INVENTOR.
DAVID W. VAN NESS
BY
Oldham & Oldham
ATTYS.

United States Patent Office 3,332,822
Patented July 25, 1967

3,332,822
APPARATUS FOR MAKING STRAND
REINFORCED WEBS
David W. Van Ness, Oakland, N.J., assignor, by mesne
assignments, to Stauffer Chemical Company, New York,
N.Y., a corporation of Delaware
Filed June 16, 1964, Ser. No. 375,443
8 Claims. (Cl. 156—427)

ABSTRACT OF THE DISCLOSURE

A pair of endless helically wound springs are positioned to have parallel reaches passing through a member for deposit of strands wound around and extending between the springs. Guide means are provided for engaging the springs as soon as the strands are wound thereon, which guide means retain the springs in fixed relationship to each other as they are advanced along parallel courses. Means to apply plastic to the deposited strands and oven means for curing the deposited plastic are provided. The web is cut from the springs and wound up on a carrier.

---

This invention relates to apparatus for making strand reinforced webs, and, more particularly, is concerned with apparatus of this type wherein strands are wound helically upon spaced parallel reaches of endless helically wound metal springs.

It is the general object of the present invention to provide relatively inexpensive, easily operated, and inexpensively maintained apparatus for producing strand reinforced webs wherein the strands are wound helically upon parallel reaches of endless metal springs to produce a web, the springs with the webs thereon then being held and guided without deflection as the web is advanced through a plastic applying station, a plastic curing station, knife means for cutting the web from the springs, and a windup apparatus for the web.

Another object of the invention is the provision of apparatus of the character described wherein a pair of endless rubber V-belts are utilized to grip each parallel reach of the metal springs with the web thereon, each belt being gripped by V-shaped carriers mounted on an endless chain, and with the chains rolling in turn on fixed guides.

Another object of the invention is the provision of slotted fixed tubular guides for supporting each parallel reach of metal spring after the web has been formed thereon, the fixed tubular guides being utilized in conjunction with the opposed V-belt guides or instead of the V-belt guides.

Another object of the invention is the provision of means for selectively adjusting the speed of movement of the parallel reaches of the metal springs in relation to the rotary speed of the means for helically winding the strands on the reaches so as to control the helix angle and the spacing between the strands, the aforesaid means usually being employed in conjunction with means for selectively adjusting the pitch of the metal springs.

The foregoing objects of the invention and other objects which will become apparent as the description proceeds, are achieved by the provision of apparatus for making strand reinforced webs including a pair of endless helically wound metal springs, means supporting the springs to provide opposed parallel reaches, means for advancing the parallel reaches, means for helically winding strands around the advancing parallel reaches to provide a web, means engaging the springs on the parallel reaches thereof immediately after the formation of the web and holding the reaches against deflection as the web is advanced by the advancing springs, means for applying plastic to the web, means for cutting the web from the springs, and means for winding up the web.

For a better understanding of the invention reference should be had to the accompanying drawings wherein:

FIGURE 1 is a plan view of one embodiment of the apparatus incorporating the principles of the invention;

FIGURE 2 is an enlarged fragmentary cross sectional view taken substantially on line 2—2 of FIGURE 1 and illustrating the opposed V-belts and chains for supporting one parallel reach of the metal springs of the apparatus;

FIGURE 3 is an enlarged fragmentary view, partially in cross section, and taken substantially on line 3—3 of FIGURE 1 and illustrating the fixed slotted tubular guides utilized to support a parallel reach of the metal springs of the apparatus; and FIGURE 4 is a side elevation of an embodiment of the invention utilizing heated rolls for consolidating a web.

Having more particular reference to the drawings, the numeral 10 indicates generally each of a pair of endless helically coiled metal springs appropriately mounted by means 12 so as to provide rather widely spaced parallel reaches 14 which extend in the manner illustrated substantially the full length of the apparatus of FIGURE 1. In a typical embodiment of the apparatus the springs 10 have a diameter of ⅝ of an inch and are made from sixteen gage wire.

The springs 10 are continuously advanced in the directions of the arrows 16, as for example by a motor 18 driving through a reduction gear box 20 to shafts 22 which drive the adjacent support means 12 for the springs 10.

A feature of the invention is that the pitch of each metal spring 10 can be changed by moving and reclamping one of the support means 12 to any adjusted position along a support plate 24, for example to the dotted line position marked 12a. In this manner with the spring 10 having a different pitch it is possible to have a different spacing between the strands wound on the parallel reaches 14 as hereinafter more particularly explained.

Mechanism is provided for helically winding strands on the parallel reaches 14 of the springs as these reaches are advanced in the direction of the arrows 16, and such mechanism conveniently takes the form of a spinner ring 26 carrying a plurality of strand bearing spindles 28 thereon, this ring surrounding the reaches 14 and being carried by rollers 30. The spinner ring is rotated by a shaft 32 extending from a reduction gear box 34 associated with the gear box 20. A variable speed control 36 is provided on the gear box 34 and an adjustable speed control 38 on the gear box 20 as that the relative speed of the metal springs as they are advanced in the reaches 14 is so related with the rotating speed of the spinner ring 26 and the pitch of the metal springs so that the strands indicated by the numeral 40 in each of FIGURES 2 and 3 are at selected and uniform spacings in the resulting web. By properly correlating the relative speeds of the forward movement of the reaches 14 and the rotary speed of the spinner ring 26 the strands 40 can be wound upon every convolution of the spring 10, upon every second convolution, every third convolution, or on substantially the selected convolution. The pitch of the springs is adjusted to receive each helical wrap in proper position.

It will be recognized that the strands 40 as they are wound upon the parallel reaches 14 of the springs 10 adjacent the spinner ring 26 are wound on these reaches in a helical manner, each helical wrap slipping through the convolutions of the spring 10 and ending up being held by the spring in the manner shown in FIGURES 3 and 4. It is now necessary to support the springs 10 and hold them against deflection during the time that the web resulting from the overlapping strands 40 passes through the remainder of the apparatus. This is accomplished by providing slotted tubes 44, the slots being indicated at 46, these tubes 44 being mounted to substantially surround and support the parallel reaches 14 as soon as the web has been made from the strands 40. The tubes 44 are spaced such a distance from the spinner ring 26 as to allow the strands to be laid at a desired or selected angle on the parallel reaches 14 of the springs 10. It will be seen from FIGURE 3 that the strands 40 extend out through the slots 46 in the fixed tube 44, each strand 40 being shown as being looped around a single convolution of the spring 10.

The tubes 44 illustrated and described can be extended the full length of the apparatus to guide and support the parallel reaches of the springs 10 over substantially their full length of travel through the apparatus. However even though a lubricant can be employed between each spring 10 and the inside of tube 44 there is considerable frictional resistance to the travel of the spring 10 through the tube, and this is particularly true if the strands 40 are wound under a reasonable tension.

Accordingly, in the preferred practice of the invention the parallel reaches 14 of the springs 10 are adapted to be held against deflection by means of a pair of opposed V-belts, and this structure is more particularly shown in FIGURE 2. One endless V-belt 50 formed with a semicircular opening 52 in its widest face engages with the upper half of the spring 10 while a second endless V-belt 54 engages by means of a semi-circular opening 56 in its wide face with the other half of the outer surface of the spring 10, the strands 40 extending laterally from the spring 10 and engaged by the flat surfaces of the V-belts in the manner shown in FIGURE 2. The V-belt 50 is carried in V-shaped metal guides 58 of relatively linear short length each carried upon a link of a chain indicated as a whole by the numeral 60, the chain 60 also being endless. The endless chain 60 has rollers 62 rotatable upon a hardened guide plate 64 mounted on fixed channels 56. The V-belt 54 is carried upon a similar chain and support, this being indicated as a whole by the numeral 68 and inasmuch as this chain and its support is identical to that already described the chain 68 will not be described in detail.

The resulting structure provides a very firm and positive holding of each parallel reach 14 of each spring 10 throughout the remainder of the travel of the parallel reaches through the apparatus. The web formed by the strands 40 is thus held flat and taut during the travel of the web through the apparatus so that subsequent operations can be performed on the web in the manner soon to be described. The opposed pair of V-belts illustrated in FIGURE 2 and adapted to engage with each parallel reach of each spring 10 are illustrated in FIGURE 1 of the drawings as engaging with the springs 10 immediately after the springs leave the tubes 44. However, it will be recognized that the tubes 44 could be omitted and the pairs of parallel belts could be extended up closer to the spinner ring 26 with the belts performing the entire function of supporting the parallel reaches 14 of the springs 10 throughout the supported travel thereof through the apparatus.

Associated with the apparatus are means 72 for applying plastic to the web of strands 40. Usually this plastic applying apparatus is in the form of a bank or row of plastic spray guns 72 which apply liquid plastic with a curing agent therein to the web of strands. The plastic applying means can in addition to the spraying operation, or as an alternative thereto, apply a continuous sheet of plastic to the web of strands by making the mechanism 72 to include a roll of plastic sheet, paper, or the like which can be applied to the web. Also, at another station indicated by the numeral 74 it is possible to provide a plurality of longitudinally extending strands to the web, to the top thereof, the bottom thereof, or both should this be found advisable.

The web next passes to a drying or curing oven indicated by the numeral 76, appropriately heated to effect the curing up of the plastic and the web of strands. As the web passes from the oven 76 knives 78 sever the web from the springs 10, usually adjacent the support means 12 and the finished web is wound up upon suitable means 80.

There is considerable weight and some friction present in the opposed V-belt and chain guide mechanism of FIGURE 2 and it is usually advisable to drive the chains 60 and 68 and thus the opposed V-belts 50 and 54. This is accomplished by the provision of a motor 82 operating through a reduction gear box 84 and having a speed control 86 thereon, the gear box 84 being connected to effect the drive described by means of a shaft 88 and appropriate gearing.

In certain embodiments of the invention the spraying of the web and the curing of the plastic in the oven can be avoided, and the oven 76 eliminated, by passing the web, marked 40a, between heated rollers 94, as seen in FIGURE 4. This practice is usually practical only when the strands are of thermoplastic material, such as vinyl, so that the cross over points of the strands are heat sealed together. Also when strands formed into the web have a thermoplastic sheet of previously formed plastic applied thereto, as heretofore described, it is possible to heat seal with rollers 84 either vinyl strands or strands of fiberglass or nylon into the thermoplastic sheet.

It should also be noted in the construction and operation the apparatus described that the geometry of the carrier springs 10 is important, among other reasons in order to prevent objectionable vibrations and oscillations. It is usually desirable to keep the outside coil diameter between about 6 and about 8 times the wire diameter. Typical wire diameters are between about .075" and about 1.00". Typical spring diameters then fall between about .4" and about .8". The spring is made from carbon or stainless steel, and is provided with a number of coils per inch equal to the desired spacing between the strands. In the form illustrated the spring has a pitch of ⅛" providing 8 coils per inch to provide ⅛" spacing between the strands. This can be adjusted to provide greater pitch and spacing in the manner heretofore described, or a spring with a different pitch can be used initially or interchangeably.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus for making strand reinforced webs including a spinner ring, a plurality of strand carrying spools on the ring, means for rotating the spinner ring, a pair of endless helically wound springs having parallel reaches passing through the spinner ring about which the strands are wound as the spinner ring rotates, adjustable speed means for advancing the parallel reaches of the springs, fixed tubular guide means for supporting portions of the parallel reaches of the springs as soon as the strands are wound thereon, said tubular guide means being slotted to allow the strand means to extend as a web between the parallel reaches of the springs, a pair of endless V-belts for gripping each parallel spring reach after it leaves the tubular guide means, semicircular grooves in each belt engaging over substantially half of spring, and endless chain having V-shaped carriers supporting each belt, fixed guides upon which each chain rolls, means for driving each chain, means for adding longitudinal strands to the web, means for applying plastic to the web, oven means for curing the plastic after it is applied to the web, knife means for cutting the web from the springs near the end of the parallel reaches thereof, and means for winding up the web.

2. Apparatus for making strand reinforced webs including a spinner ring, a plurality of strand carrying spools on the ring, means for rotating the spinner ring, a pair of endless helically wound springs having parallel reaches passing through the spinner ring about which the strands are wound as the spinner ring rotates, adjustable speed means for advancing the parallel reaches of the springs, fixed tubular guide means for supporting portions of the parallel reaches of the springs as soon as the strands are wound thereon, said tubular guide means being slotted to allow the strand means to extend as a web between the parallel reaches of the springs, means for adding longitudinal strands to the web, means for applying plastic to the web, oven means for curing the plastic after it is applied to the web, knife means for cutting the web from the springs near the end of the parallel reaches thereof, and means for winding up the web.

3. Apparatus for making strand reinforced webs including a spiner ring, a plurality of strand carrying spools on the ring, means for rotating the spinner ring, a pair of endless helically wound springs having parallel reaches passing through the spinner ring about which the strands are wound as the spinner ring rotates, adjustable speed means for advancing the parallel reaches of the springs, a pair of endless V-belts for gripping each parallel spring reach, semi-circular grooves in each belt engaging over substantially half of spring, an endless chain having V-shaped carriers supporting each belt, fixed guides upon which each chain rolls, means for driving each chain, means for adding longitudinal strands to the web, means for applying plastic to the web, oven means for curing the plastic after it is applied to the web, knife means for cutting the web from the springs near the end of the parallel reaches thereof, and means for winding up the web.

4. Apparatus for making strand reinforced webs including a spinner ring, a plurality of strand carrying spools on the ring, means for rotating the spinner ring, a pair of endless helically wound springs having parallel reaches passing through the spinner ring about which the strands are wound as the spinner ring rotates, adjustable speed means for advancing the parallel reaches of the springs, a pair of endless V-belts for gripping each parallel spring reach, an endless chain having V-shaped carriers supporting each belt, fixed guides upon which each chain rolls, means for applying plastic to the web, oven means for curing the plastic after it is applied to the web, knife means for cutting the web from the springs near the end of the parallel reaches thereof, and means for winding up the web.

5. Apparatus for making strand reinforced webs including a pair of endless helically wound metal springs, means supporting the springs to provide opposed parallel reaches, means for advancing the parallel reaches, means for helically winding strands around the advancing parallel reaches to provide a web, means surrounding the springs on the parallel reaches thereof immediately after the formation of the web and holding the reaches against deflection as the web is advanced by the advancing springs, means for spraying the web with plastic, means for curing the plastic, means for cutting the web from the springs, and means for winding up the web.

6. Apparatus for making strand reinforced webs including a pair of endless helically wound metal springs, means supporting the springs to provide opposed parallel reaches, means for advancing the parallel reaches, means for changing the pitch of the springs, means for helically winding strand around the advancing parallel reaches to provide a web, means engaging the springs on the parallel reaches thereof immediately after the formation of the web and holding the reaches against deflection as the web is advanced by the advancing springs, means for applying plastic to the web, means for cutting the web from the springs, and means for winding up the web.

7. Apparatus for making strand reinforced webs including a pair of endless helically wound metal springs, means supporting the springs to provide opposed parallel reaches, means for advancing the parallel reaches, means for helically winding strands around the advancing parallel reaches to provide a web, means engaging the springs on the parallel reaches thereof immediately after the formation of the web and holding the reaches against deflection as the web is advanced by the advancing springs, means for selectively changing the pitch of the springs, means for applying plastic to the web, means for cutting the web from the springs, and means for winding up the web.

8. Apparatus for making strand reinforced webs including a pair of endless helically wound metal springs, means supporting the springs to provide opposed parallel reaches, means for advancing the parallel reaches, means for helically winding strands around the advancing parallel reaches to provide a web, means to vary the forward speed of the parallel reaches of the springs in relation to the rotary speed of the means for helically winding the strands to control the spacing and angle of the strands in the web, and means for adjusting the pitch of the springs to adapt them to the selected forward speed of the springs and the selected rotary speed of the means for helically winding the strands.

References Cited
UNITED STATES PATENTS

| | | | |
|---|---|---|---|
| 2,954,816 | 10/1960 | Havemann | 156—427 XR |
| 2,954,817 | 10/1960 | Havemann | 156—427 XR |
| 3,041,230 | 6/1962 | Diehl | 156—439 XR |
| 3,149,014 | 9/1964 | Havemann | 156—439 XR |
| 3,169,087 | 2/1965 | Van Ness et al. | 156—431 |

EARL M. BERGERT, *Primary Examiner.*

J. P. MELOCHE, *Assistant Examiner.*